Figure 1:
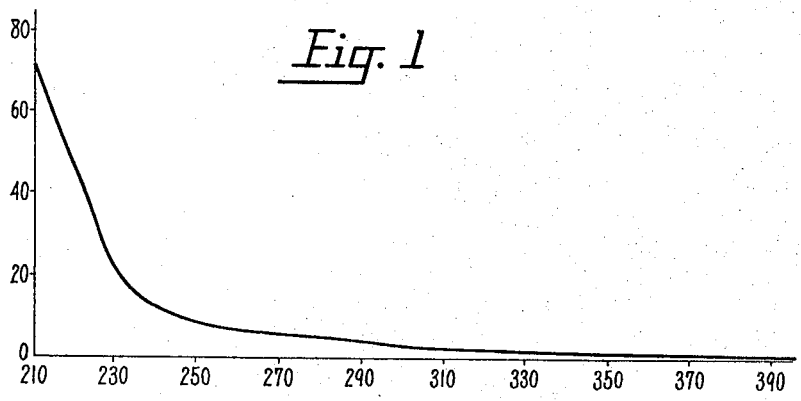

United States Patent [19]

Harada et al.

[11] 3,868,450

[45] Feb. 25, 1975

[54] PROCESS FOR PRODUCING AN ANTI-VIRUS SUBSTANCE FOR PLANTS

[75] Inventors: Yujiro Harada, Tokyo; Kiyoshi Kumabe, Funabash; Tsuneo Sato, Yokohama; Yoshinobu Miyamura, Ube; Fumio Kato, Sunto; Mikio Tanimoto, Kofu, all of Japan

[73] Assignee: Kyowa Hakko Kogyo Kabushiki Kaisha, Chiyoda-ku, Tokyo, Japan

[22] Filed: Apr. 19, 1972

[21] Appl. No.: 245,642

Related U.S. Application Data

[63] Continuation-in-part of Ser. No. 90,084, Nov. 16, 1970, abandoned, Continuation-in-part of Ser. No. 843,343, July 22, 1969, abandoned.

[52] U.S. Cl. .............................. 424/115, 195/80 R
[51] Int. Cl. .......................................... H61k 21/00
[58] Field of Search...................... 424/115; 195/80

[56] References Cited
OTHER PUBLICATIONS

Miller, The Pfizer Handbook of Microbial Metabolites, McGraw-Hill Book Co., Inc., N.Y., N.Y., 1961, pages 610–612.

Primary Examiner—Jerome D. Goldberg
Attorney, Agent, or Firm—Wolder & Gross

[57] ABSTRACT

A process for producing a new antivirus substance denoted 84-B-3 having the ability to inhibit plant disease virus is taught, the substance being obtained from streptomyces strains.

3 Claims, 2 Drawing Figures

PROCESS FOR PRODUCING AN ANTI-VIRUS SUBSTANCE FOR PLANTS

RELATED APPLICATIONS

The present application is a continuation-in-part of U.S. Ser. No. 90,084, filed Nov. 16, 1970, which is in turn a continuation-in-part of U.S. Ser. No. 843,343, filed July 22, 1969, all in the name of the present inventors; both said applications are now abandoned.

SUMMARY

The present invention relates to a new useful antivirus substance which is denoted as 84-B-3 and the method for the production thereof which specifically relates to the production of 84-B-3 by fermentation, as well as the purification as well as the recovery of the same.

The products obtained by the process of the present invention may be in the forms of dilute solution, crude concentrate, purified solid and purified crystal of the antivirus substance itself and the salts thereof. It has been found that the substance 84-B-3 inhibits the growth of plant disease virus which are specifically exemplified by tobacco mosaic virus, cucumber mosaic virus, radish mosaic virus, alfalfa mosaic virus, etc. The substance 84-B-3 has prophylactic effects against them when applied to or sprayed on seeds or leaves of test plant. Generally concentrations of 1 mg/ml to 100 mg/ml, preferably 10 mg/ml to 50 mg/ml of 84-B-3 (crude crystals obtained in Example 2) are used. It is a significant characteristic unknown among known anti-plant-disease-virus agents that 84-B-3 is absorbed onto the leaves of test plant to produce significant prophylactic effects when sprayed thereon.

The strains capable of producing the substance 84-B-3 according to the present invention were isolated from the soil collected at Setagaya-ku, Tokyo-to, Japan. In the isolation, there have been found various strains which are also capable of producing the substance although their bacteriological properties are apparently distinguishable from each other. Examples of suitable strains all freely available to the public are:

Streptomyces rameus No. 154 (ATCC 21273) and
Streptomyces S.P. No. 290 (ATCC 21274)

Among strains having prominent ability to produce 84-B-3 is included, for example, *streptomyces rameus* No. 154 (ATCC 21273) which is freely available to the public and which has the following characteristics:

CHARACTERISTICS OF *STREPTOMYCES RAMEUS* NO. 154

1. Morphological characteristics

Growth in the form of a mycelium, longly curved or waving branched, having a width of about 0.9–1.5 microns when cultured on a yeast extract-malt agar at 28°C. Mycelium produces aerial mycelium arranged in clusters. The extreme point of aerial mycelium is imperfect spiral or hooked. Spores arranged in chain at the extreme point of aerial mycelium. According to electronic-microscopic observation, spores have smooth surfaces and are ellipsoidal, 1.3–1.6 × 2.6–2.7 microns in diameter.

2. Czapek agar (cultured at 28°C)

Growth elevated, olive-colored (1 lg) with wrinkles on surface. Aerial mycelium, yellowish white (1 ba) to bright gray (2 dc). Soluble pigment pale yellowish brown (2 ie) to dark brown (3pn).

3. Glucose Czapek agar (cultured at 28°C)

Growth elevated, dark brown colored (2 pn) with wrinkles on surface. Water drops produced. Aerial mycelium, velvety and gray (f). Soluble pigment pale brown (3 lg 3 ni).

4. Glucose-asparagin (Krainsky) agar (cultured at 28°C)

Growth, abundant elevated, pale brown (1½ li) with aerial mycelium gray (2 fe) to beige (3 gb). Soluble pigment pale yellowish brown (2 ie) to pale brown (3 lg).

5. Calcium malate agar (cultured at 28°C)

Growth, transparent, lichenoid, Aerial mycelium powder-like, deer-hair colored (4 ge). No soluble pigment produced.

6. Glucose peptone broth (cultured at 28°C):

Growth, transparent, elevated with wrinkles on surface. Aerial mycelium velvety and white (a). Soluble pigment pale yellowish brown (2 ie) to dark orange (4 ng).

7. Nutrient agar (cultured at 28°C):

Growth transparent; aerial mycelium velvety, white (a) to grayish white (b). Soluble pigment bamboocolored (2 gc).

8. Loeffler's blood serum medium (cultured at 37°C):

Growth transparent; aerial mycelium white (a). Soluble pigment dark brown (4 pn). Serum haemolysed.

9. Blood agar (cultured at 37°C):

Growth linchenoid; aerial mycelium scattered, bright gray (c). Soluble pigment dark reddish brown (6½ pl). No haemolysis occurred.

10. Potato agar (cultured at 28°C):

Growth elevated, olive colored (1½ pl) with wrinkles on surface; aerial mycelium velvety, gray (2 ih to 3 ih). Soluble pigment dark brown (3 nl) to chocolate (4 nl).

11. Egg albumen agar (cultured at 37°C):

Growth transparent, lichenoid; aerial mycelium powder-like, yellowish brown (2 ge) to gray (f). Soluble pigment pale yellowish brown (2 ie) to cinnamon (3 le).

12. Starch agar (cultured at 28°C):

Growth transparent, elevated; aerial mycelium velvety, white (a) to gray (1 ih). Soluble pigment pale brown (3 lg). Starch liquefied.

13. Glucose tyrosine agar (cultured at 28°C)

Growth linchenoid, bamboo-colored (2 gc); aerial mycelium scattered, dark yellow (2 gc) to yellowish brown (2 ge). No soluble pigment.

14. Melanin-formation medium (cultured at 28°C):

Growth transparent; aerial mycelium velvety, gray (e) to silver gray (3 fe). Soluble pigment pale brown (3 lg) to dark chocolate (5 po). Tyrosinase active.

15. Peptone-yeast extract-iron agar (available from Difco Co., U.S.A.) (cultured at 28°C):

Growth elevated, dark gray (m to n); aerial mycelium poor, gray (g). Soluble pigment blackish brown (3 po) to dark chocolate (5 po). $H_2S$ produced.

16. Yeast extract-malt agar (available from Difco Co., U.S.A.) (cultured at 28°C):

Growth elevated, dark olive-colored (1½ pn); aerial mycelium abundant, gray (2 fe) to dark (3 ig). Soluble pigment dark brown (3 pn to 4 pn).

17. Bacto nitrate broth (prepared by Difco Co., U.S.A.) (cultured at 28°C):

Growth on the surface of liquid medium in the form of film, white; no aerial mycelium. Soluble pigment amber-colored (3 pe).

18. Litmus milk (cultured at 37°C):

Soluble pigment dark brown (5 pl) to dark chocalate (5 po). No milk coagulation. Peptonization occurred.

19. Gelatin (cultured at 20°C):

Growth yellowish brown (3 pi); aerial mycelium velvety, white (a). Soluble pigment dark orange (4 pg). Almost no liquefaction.

20. Potato Plug (cultured at 28°C):

Growth dark brown (3 nl); aerial mycelium gray (e to 3 dc). Soluble pigment black (p).

21. Carrot plug (cultured at 28°C):

No growth.

22. Cellulose medium (cultured at 28°C):

No growth.

23. Utilization of carbon sources (Pridham-Gottlieb salt used as basal medium):

D-glucose, L-arabinose, D-mannose, L-levulose, rhamnose, D-mannitol, inositol, lactose, sacchorose, maltose, cellobiose, D(+)-raffinose, D-trehalose utilized. Sorbitol, cellulose almost not utilized.

Note: The sign in ( ) is a color number according to "Color Harmony Manual" 4th Edition.

In comparison the above mentioned properties with those of known Streptomyces strains disclosed in "The Actinomycetes" S.A. Waksman Vol. II (published by The Williams and Wilkins Co., 1961), the present strain is most similar to *Streptomyces rameus*. While the following differences are found:

The aerial mycelium of *Streptomyces rameus* is white in glucose-asparagin agar medium and is also white in potato plug medium. While that of the strain capable of producing the substance 84-B-3 is gray to beige in the former medium and is gray in the latter medium. Moreover, *Streptomyces rameus* utilizes no or little rhamnose and does not grow. While the present strain utilizes well rhamnose and grows well. However, Streptomyces group generally is liable to change naturally or artificially its properties on medium so that it can not be said that the properties of the present strain are unchanged. In comparison, the present strain with Streptomyces rameus regarding to this item, the differences are not sufficiently significant for distinguishing the present strain from another species. Therefore it is reasonable to conclude that the present strain belongs to the genus of *Streptomyces rameus*.

As above mentioned, the properties of the strain, when cultured on various media, can not be unchangeable. Therefore, any strain which may be isolated from the soil as a variant of the preset strain or which is a mutant derived from the present strain by a known method may be used for the purpose of the present invention, as far as it is capable of producing the substance 84-B-3.

As noted previously strains which may be used for the present invention are not limited to the *Streptomyces rameus* No. 154 (ATCC 21273) and various other 84-B-3 producing strains belonging to Streptomyces denoted previously are suitable.

PROCESS CONDITIONS

In carrying out the production of the substance 84-B-3 according to the present invention, known cultivating methods such as for example, solid cultivation method under aerobic condition, standing cultivation method, submerged cultivation method, etc. may preferably be used. Best results can, however, be obtain for example by the submerged cultivation method.

As the carbon sources of the medium, saccharide materials such as starch, glucose, dextrin, sucrose, molasses, etc. or various other relating assimilable materials can be used. As the nitrogen sources, natural materials such as, for example, soybean flour, soybean meal, soluble vegetable protein, corn steep liquor, yeast or the autolysate thereof, meat extract, peptone, etc. and various other inorganic and organic nitrogen compounds such as e.g. ammonium sulfate, ammonium nitrate, ammonium chloride, urea, etc. can be used. Further, inorganic salts, trace nutrients, digesting agents and other supplemental agents may also be used.

In carrying out the submerged cultivation of the strains of the present invention the medium is preferably adjusted to from a weakly acidic to a weakly alkaline nature (pH 6 to 8) and the cultivating temperature is preferably from about 22°C–40°C. Under suitable aerating and stirring conditions, accumulation of the substance 84-B-3 can be found after 12 hours and the potency reaches to its maximum after 24–144 hours. Regarding to the prophlactic effects (prophylatic value), 84-B-3 in the cultured broth can be determined by means of the disease spots-calculating method of *Nicotiana glutinosa* using tobacco mosaic virus.

PURIFICATION

According to the present invention, it is possible to isolate and purify the substance accumulated in the cultured broth by means of a physical-chemical procedure which utilizes properties of the substance 84-B-3 as follows:

The filtrate of the fermented broth obtained by the above mentioned process is directly passed through a resin column packed with a cation exchange resin to adsorb 84-B-3 onto the resin. The resin is washed with a large amount of deionized water and is then eluted with an alkaline solution (preferably diluted ammonia water). The eluate is concentrated under reduced pressure and lyophilized to result brown crude powder. When a further purification is desired, the brown crude powder obtained by the ion exchange process are dissolved in water and are adsorbed again onto a cation exchange resin to remove impurities. The resin is washed with a large amount of deionized water and is eluted with an alkaline solution (preferably, ammonia water). The eluate is concentrated in vacuo and is lyophilized to give brown powder. The resultant powdery 84-B-3 shows a considerable preventing value and can be used further without after-treatment. When a further purification and isolation are desired, the decolorization and isolation of 84-B-3 can be carried out by alumina column chromatography using water as developing agent. When the removal of remaining traceable amounts of impurities and coloring matters are desired, the resultant crude product is further subjected to powdery cellulose chromatography using the supernatant of a mixture of n-butanol, acetic acid and water as developing agent. After this, the resultant active fraction is concentrated in vacuo and lyophilized. Alternatively, the crude product is purified by means of a gel-form filtering agent and water as developing agent, and the resultant active fraction is concentrated in vacuoo and lyophilized to give white to pale yellow purified powder.

According to the present invention, it is also possible to purify the substance 84-B-3 by utilizing the liability that 84-B-3 is readily adsorbed onto active carbon, for example, as follows:

A fermented broth is adjusted to pH 6–7 and added with active carbon and, if desired, a small amount of a suitable filter aid. Then the mixture is stirred to adsorb 84-B-3 onto the active carbon. The adsorbed 84-B-3 can readily be eluted from the active carbon by an alkaline organic solvent containing water (preferably ammonia methanol). The eluate is concentrated in vacuo and lyophilized to give brown crude powder. The resultant powder of 84-B-3 shows a considerable preventing value and can be used further without after-treatment.

However, when a further purification of the crude 84-B-3 is desired, the crude powder is dissolved in methanol containing 20% water. Preferably after removing insoluble impurities, the solution is subjected to alumina column chromatography using water as developing agent. The obtained active fraction is concentrated in vacuo and is lyophilized to result yellow powder. When a further purification is desired, the yellow powder is subjected to a silica-gel chromatography using a suitable alkaline aqueous organic solvent (preferably a mixture of ethanol and 0.5N ammoniac water (2:1) ) and the obtained active fraction is concentrated in vacuo and lyophilized to give pale yellow powder. When the removal of remaining traceable amounts of impurities is further desired, the above mentioned product is subjected to column chromatography of gel filtering agent (such as Sephadex G-10, G-15 and G-25 available from Pharma Cia., Uppsana, Sweden) using water as developing agent. Then the obtained active fraction is concentrated in vacuo and lyophilized to give whitish to pale yellowish purified hygroscopic product of 84-B-3.

According to the present invention, in addition to the foregoing purification procedures, it is also possible to purify the crude product by the combined use of active carbon and cation exchange resin, for example, in the following manner.

A fermented broth is adjusted to pH 6–7 and added with active carbon and, if desired, a small amount of a suitable filter aid. The mixture is then stirred to adsorb 84-B-3 onto active carbon. The adsorbed 84-B-3 can readily be eluted from active carbon with an alkaline aqueous organic solvent (preferably ammoniac methanol). The eluate is concentrated in vacuo and lyophilized to result brown crude powder.

The resultant powder of 84-B-3 has a considerable preventing value and can be used further without after-treatment. If a further purification is desired, the crude powder obtained by the above mentioned active carbon method is dissolved in water and is then passed through a resin column packed with a cation exchange resin, e.g. Diaion SK No. 1A (available from Mitsubishi Kasei Kogyo K.K., Japan) (H-form) for adsorb 84-B-3 onto the resin. The resin is washed with a large amount of deionized water and is eluted with 3.5% aqueous ammonia. The eluate is concentrated in vacuo and is lyophilized to give brown hygroscopic powder. It it is desired to purify the obtained powdery product further, the product is subjected to alumina chromatography. By developing and eluting with water, the decolorization and isolation can be carried out simultaneously. If it is desired to remove remaining traceable amounts of impurities and coloring matters further, it is preferred to purify the crude substance by using gel filtering agent such as Sepadex G-10, G-15 or G-25 (available from Pharma Cia., Uppsana, Sweden). Other filtering agents such as sawdust, asbestos pulp, talc, active carbon, etc. can be used.

CHARACTERISTICS OF 84-B-3

Figure 2:
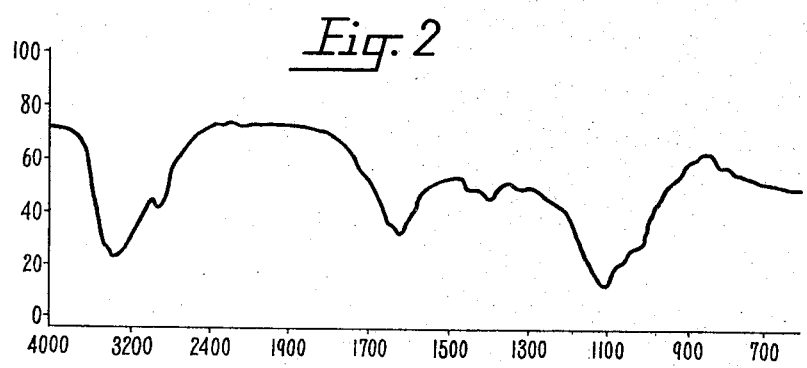

Developing with water, the active fraction obtained from the foregoing procedure is concentrated in vacuo and lyophilized to result whitish to pale yellowish purified 84-B-3. Thus resultant substance 84-B-3 decomposes at 161°–164°C and has a molecular weight of about 300–400 which is determined by using Sephadex G-25. The thus-obtained product can readily be dialyzed through cellophane membrane. The infrared spectrum (by using KRr tablet) of the product is shown in FIG. 2, while the ultraviolet spectrum of its aqueous solution has no specific adsorption as shown in FIG. 1.

84-B-3 is readily soluble in water, but is hardly soluble in various organic solvents. 84-B-3 is stable to heat and to pH in its neutral and alkaline state, while it is somewhat unstable in acidic state. For example, when the substance 84-B-3 is heated for 1 hour at a pH of 12, 30% and 25% of its initial activity are destroyed by heating at 100° and 80°C respectively, and the inactivation hardly occurs by heating at 60°C. However, at a pH 2.0 it loses almost all activities by heating at 100°C or 80°C and loses 50% of the initial actvity when heated at 60°C.

Respecting color reactions it is found that Molish reaction, Anthron reaction, Elson-Morgan reaction, o-aminophenol reaction, anisaldehyde reaction and naphthoresorcin reaction are positive, while Sakaguchi reaction, Buret reaction, Millon reaction, Wheeler Tollens reaction, ferric chloride reaction, Ehrlich reaction, active methylene reaction and Ninhydrin reaction are negative.

When the substance 84-B-3 is subjected to silica-gel thin layer chromatography using a mixture of n-propanol-ammonia-water (3:1:1 — by volume) as developing solvent, the active substance is observed as a single spot at Rf 0.2, of which color is developed by Elson-Morgan reaction. The substance 84-B-3 is confirmed to be a weakly basic substance from the observation that the substance moves toward negative pole by 1 cm when subjected to electrophoresis with 550 volt using phosphoric acid buffer solution (1/15 mol) at pH of 7.1 for 3 hours.

TABLE I

| Tested microorganism | Minimum inhibition concentration (mcg/ml) |
| --- | --- |
| Staphylococcus aureus 209P | 200 |
| Staphylococcus aureus Y* | 200 |
| Sarcina lutea 1001 | 200 |
| Bacillus subtilis ATCC 6633 | 200 |
| Escherichia coli K-2 | 200 |
| Penicillium chromogenes | 200 |
| Candida albicans YU-1200 | 200 |
| Torula utilis Y-5-1 | 200 |

*This strain resistant to Streptomycin, tetracycline and Penicilline.

As from this table, it is found that the substance 84-B-3 has entirely no antibacterial and antifungal activity as far as the above-mentioned microorganism are concerned.

However, respecting antivirus activity, the substance shows a preventing value of 92% at 1 mcg/ml against tobacco mosaic virus.

With reference to sumuli's "ANTIBIOTICS" (published by Tokyo University Press, 1961) and some latest magazines, among known antibiotic substances for plant diseases are included, for example, 2, 6-dinitrophenol, 2-thiouracil, 2-thicytosin, 2-thithymine, naphthalene acetic acid, 2, 6-diaminopurine, 8-azaguanine, 8-azadenine, ϵ-carbobensoyl-L-lysine polypeptide and β [- 5-imino-2-propylidene carboxide ] propamidene dihydrochloride.

In contrasting such known antibiotic agents with the substance 84-B-3, 84-B-3 is positive in Molish reaction and Anthron reaction, while above mentioned agents are negative. Moreover, all of 2,6-dimitrophenol, 2-thiouracil, 2,6-diaminopurine, 8-azaguanine and 8-azadenine are water-insoluble or hardly soluble, whereas 84-B-3 is very readily soluble. ϵ -Carbobenzoyl-L-lysine polypeptide is a high molecule substance, while the molecular weight of 84-B-3 is low so that it can readily be dialyzed through cellophan membrane. Furthermore, β- [5-iminopropylidene-carboxide] propamidene dihydrochloride has no antivirus effect at a concentration less than 1 mg/ml, while 84-B-3 has significant effects at a concentration less than 1 mog/ml. Accordingly, it can be said that 84-B-3 is a novel antibiotic substance which can be distinguished from known antibiotic substances effective for plant disease virus.

DRAWINGS

FIGS. 1 and 2 show the ultraviolet spectrum and infrared spectra, respectively, of 84-B-3 produced according to this invention.

EXAMPLES

The following non-limitative examples illustrate the invention. However, it should be noted that the medium and other cultivation conditions exemplified in the following can be modified and that they can also be applied to other strains capable of producing 84-B-3 than that described in examples.

In this specification, the value designated as prophylatic value was tested in conventional manner as follows. An aqueous solution containing the substance obtained according to the present invention was sprayed on the surface of the left half of a leaf of the test plant. After this, water containing a test microorganism was sprayed on the whole surface of the leaf. After 4 days, numbers of the spots of the grown microorganism on the left half (A) and the right half (B) were calculated. The prophylactic value (P) was determined as follows:

$$B - A/P - B \times 100\%$$

The amount of the inoculated microorganism was selected in such a degree that about 100–150 spots were found on the control (B) after 4 days.

EXAMPLE 1

A medium containing 1.5% of glycerol, 3.0% of corn steep liquor, 0.5% of peptone and 0.5% of MaCl was adjusted to pH 7.1. The medium (50 ml) was put in a 500 ml Sakaguchi flask and was sterilized. Streptomyces rameus No. 154 (ATCC 21273) was inoculated and cultivated with shaking (170 r.p.m.) at 27°C. After 90–144 hours, the supernatant of the broth had 96--prophylactic value of 90–92%.

EXAMPLE 2

A medium containing 2.0% of starch, 1.0% of peptone, 1.0% of meat extract, 0.3% of NaCl and 0.1% of soybean oil was adjusted to pH 7.0. The medium (15 one) was sterilized in a 30 one jar fermenter. Streptomyces rameus No. 154 (ATCC 21273) was inoculated thereto and cultivated at 26° with stirring (250 r.p.m.) under aeration conditions (10 l/min). After 40–60 hours, the supernatant of the cultured broth was lyophilized to obtain a substance having a prophylactic value of 87–91% at a concentration of 10 mg/ml.

EXAMPLE 3

A medium containing 2.0% of glucose, 1.0% of peptone, 0.5% of meat extract, 0.25% of NaCl and 0.1% of soybean oil was adjusted to pH 7.1. The medium (1,000itor) was sterilized in a 2,000 one tank. Streptomyces rameus No. 154 (ATCC 21273) was inoculated thereto and was cultivated at 27°C with stirring (100 r.p.m.) under aeration conditions (400 l/min). After 24–48 hours, the supernatant of the cultured broth was lyophilized to obtain a substance having a prophylactic value 95–96% at a concentration of 10 mg/ml.

EXAMPLE 4

A medium containing 2.5% of molasses, 2.0%, of yeast extract, 0.2% of calcium carbonate, 0.27% of $K_2HPO_4$, 0.1% of KCl, 0.05% of magnesium sulfate and 0.001% of ferrous sulfate was adjusted to pH 7.2. The medium (3 liter) was sterilized in a 5 liter jar fermenter. Streptomyces S.P. No. 290 (ATCC 21274) was inoculated thereto and was cultivated at 30°C with stirring (450 r.p.m.) under aeration conditions (3 l/min). After 60–72 hours, the supernatant of the broth had a prophylactic value of 56–60%,

EXAMPLE 5

A lyophilized material obtained from the supernatant of the broth according to Example 2 had the following activities on various plant disease virus.

| Plant disease virus | Activity (10 mg/ml) |
| --- | --- |
| Tobacco Mosaic virus | +++ |
| Cucumber Mosaic virus | +++ |
| Broad bean necrosis mosaic virus | ++ |
| Soybean mosaic virus | + |
| Alfalfa mosaic virus | + |
| Radish mosaic virus | + |
| Radish mosaic virus | + |
| Cauliflower mosaic virus | ++ |
| Potato X virus | + |
| Potato Y virus | + |

EXAMPLE 6

A broth (1,000 liter) of 84-B-3 obtained according to Example 3 was adjusted to pH 8, and to it added 50 Kg of a conventional filter aid and filtered to give 950 liter of filtrate. The filtrate was passed through a resin column packed with 10 liter of a weakly cation exchange resin, Amberlite IRC 50 (available from Rohm & Haas, Inc., U.S.A.) ($NH_4$ - form to adsorb 84-B-3 thereon. The resin was washed with deionized water (20 liter) and eluted with 3% aqueous ammonia (20 liter) to elute completely the 84-B-3. The eluate was concentrated in vacuo to 4 liter and then lyophilized to give 900 g of brown hygroscopic crude powder (water solibility of more than 1 g/ml), of which aqueous solution (concentration of 1 mg/ml) had a prophylatic value of 68%.

EXAMPLE 7

A crude powder (100 g) obtained according to Example 6 was dissolved in methanol containing 20% of water to remove insoluble matters and passed through a resin column packed with 4 Kg of alumina which had been previously adjusted to pH 4.5 with sulfuric acid. The column was washed with 4 liter of methanol containing 20% of water and was then developed and eluted with water. After harvesting every 100 ml of the fractions, the fractions Nos. 41–50 were collected and combined to an amount of 1 liter. The eluate was concentrated in vacuo to 200 ml and was lyophilized to result 7.3 g of yellowish hygroscopic powder, of which prophylatic effects on tobacco mosaic were determined to give a prophylactic value of 99% at a concentration of 1,000 mcg/ml.

EXAMPLE 8

A powdery product (7g) obtained according to Example 7 was dissolved in 5 ml of the supernatant of a mixture of n-butanol, acetic acid and water (4:1:5) and was passed through a column packed with powdery cellulone (200 g) having a height of 1.5 meter. The column was developed and eluted with the above mentioned supernatant to harvest fractions (each 10 ml). Fractions Nos. 48–61 amounting 130 ml in total were collected and combined. The combined fractions were then added with 130 ml of petroleum ether and 100 ml of water and were shaken for 5 minutes. After separating into two layers, the aqueous layer was lyophilized to result pale yellowish hygroscopic powder (4.4g), of which effects on tobacco mosaic virus were determined to give a prophylactic value of 98% at a concentration of 100 mcg/ml.

EXAMPLE 9

A 84-B-3 containing broth (1,000 liter) obtained according to Example 3 was adjusted to pH 6. To it was added 50 Kg of a conventional filter aid and filtered to give 950 liter of the filtrate which was then passed through a column packed with a strongly acidic cation exchange resin (10 liter), Diaion SK No. 1A (available from Mitsubishi Kasei Kogyo K.K., Japan) (H-form) to adsorb 84-B-3. The column was washed with deionized water (20 liter) and eluted with 20 liter of 3% aqueous ammonia to elute completely the adsorbed 84-B-3. The eluate was concentrated in vacuo to 4 liter and was poured dropwise into methanol (50 liter) with stirring to give brown precipitate. The precipitate was filtered with suction, washed with 1 liter methanol and dried in vacuo to give 820 g of brown hygroscopic powder. The effect of the powder on tobacco mosaic virus were determined to give a prophylactic value of 72% at a concentration of 1 mg/ml. The resultant crude powder (820 g) was dissolved in water and passed through a column packed with 5 liter of a strongly acidic cation exchange resin, Diaion SK No. 10 (H-form).

The column was washed with 20 liter of deionized water and eluted with 10 liter of 3% aqueous ammonia. The elute was concentrated in vacuo to 1.5 liter, filtered and lyophilized to result 600g of brownish hygroscopic powder which had a prophylactic value of 98% on tobacco mosaic at a concentration of 1 mg/ml.

EXAMPLE 10

Powder (100 g) obtained according to Example 9 was dissolved in methanol containing 20% water, filtered to remove insoluble matters and was then passed through a column packed with 3 Kg of alumina having an adjusted pH of 4.5. The column was washed with 3 liter of methanol containing 20% water and developed and eluted with water. Fractions (each 100 ml) were harvested, and fractions Nos. 36–52 amounting 1.6 liter in total were collected and combined. The combined fractions were concentrated in value to 150 ml and lyophilized to result 5.1 g of yellowish hygroscopic powder. An aqueous solution containing 100 mcg/ml of the obtained powder had a prophylactic value of 98% on tobacco mosaic virus.

EXAMPLE 11

Powder (5g) obtained according to Example 10 was dissolved in 20 ml of water and passed through a column packed with a gel-filtering agent, Sephadex G-15 (available from Pharma Cia., Uppsana, Sweden) having a height of 1.5 meter. Elution was carried out with water to harvest fractions (each 10 ml). Fractions Nos. 78–83 amounting to 50 ml in total were collected and combined. The combined fractions were lyophilized to result 1.5g of white powder of 84-B-3. A solution containing 10 mcg/ml of the obtained substance had a prophylactic value of 96% and that containing 1 mcg/ml a preventing value 92%.

EXAMPLE 12

A fermented broth (1,100 liter) obtained according to Example 3 was adjusted to pH 6.5, added with 50 Kg of conventional filter aid and filtered. To the filtrate was added 30 Kg of active carbon and 10 Kg of the filter aid and the mixture was stirred for 30 minutes to adsorb 84-B-3 on the carbon. The active carbon was eluted 3 times with each 100 liter of a mixture of methanol and concentrated aqueous ammonia (9:1) to give 300 liter of eluate. The eluate was concentrated in vacuo to 4 liter, which was filtered and lyophilized to give 1.0 Kg of brownish hygroscopic powder, of which aqueous solution having a concentration of 1mg/ml had a prophylactic value of 60% on tobacco mosaic virus.

EXAMPLE 13

Powder (100g) obtained according to Example 12 was dissolved in methanol containing 20% water, was filtered to remove insoluble matters. The solution was passed through a column packed with 4 Kg of alumina which had been previously adjusted to pH 4.5. The column was washed with 10 liter of methanol containing 20% methanol and developed and eluted with water. Fractions (each 100 ml) were harvested, and fractions Nos. 39–51 amounting 1.2 liter in total were collected and combined. The combined fractions were concentrated in vacuo to 200 ml and lyophilized to result 8.1 g of yellowish hygroscopic powder, of which aqueous solution (concentration — 100 mcg/ml) had a prophylactic value of 95% on tobacco mosaic virus.

EXAMPLE 14

Powder (8.0g) obtained according to Example 12 was dissolved in 5 ml of water and passed through a column packed with 50 g of silica-gel. The column was developed and eluted with a mixture of ethanol and 0.5N aqueous ammonia (2:1). Fractions (each 10 ml) were harvested, and fractions Nos. 39–47 were collected and combined. The combined fractions were concentrated in vacuo to dryness to result 4.5 g of pale yellowish hygroscopic powder, of which aqueous solution (concentration — 10 mcg/ml) had a prophylactic value of 94%.

EXAMPLE 15

Powder (4 g) obtained according to Example 14 was dissolved in 15 ml of water and passed through a column packed with 500 g of gel-filtering agent (Sephadex G-15) having a height of 1.5 meter. The column was developed and eluted with water to harvest fractions (each 10 ml). Fractions Nos. 86–104 amounting 180 ml in total were collected and combined. The combined fractions were lyophilized to result 0.92 g of white powder, of which aqueous solution (concentration — 10 mcg/ml) had a prophylactic value of 97% and that containing 1 mcg/ml had a value of 93%.

EXAMPLE 16

Fermented broth (1,100 liter) containing 84-B-3 which was obtained according to Example 3 was adjusted to pH 6.5, added with 50 Kg of a conventional filter aid and was filtered to give the filtrate (1,000 liter). The filtrate was added with 10 Kg of the same filter aid and 30 Kg of active carbon and stirred for 30 minutes to adsorb 84-B-3 on the carbon. The carbon was eluted 3 times with each 100 liter of a mixture of methanol and concentrated aqueous ammonia (9:1) to give 300 liter of the eluate. The eluate was concentrated in value to 4 liter was filtered and lyophilized to result 1.0 Kg of brownish hygroscopic powder, of which aqueous solution (concentration — 1 mg/ml) had a prophylactic value of 60% on tobacco mosaic virus.

EXAMPLE 17

Powder (500 g) obtained according to Example 16 was dissolved in water (1 liter) and passed through a column packed with 5 liter of a strongly acidication exchange resin, Diaion SK No. 1 (available from Mitsubishi Kasei Kogyo K.K., Japan) (H-form). The column was washed with 20 liter of deionized water and eluted with 15 liter of 0.1% aqueous ammonia. The eluate was concentrated in vacuo to 500 Ml and lyophilized to give 190 g of brownish hygroscopic powder, of which aqueous solution (concentration — 1 mg/ml) had a prophylactic value of 82% on tobacco mosaic virus.

EXAMPLE 18

Powder (100 g) obtained according to Example 17 was dissolved in methanol containing 20% water and filtered to remove insoluble matters. The solution was passed through a column packed with 3.5 Kg of alumina having an adjusted pH of 4.5. The column was washed with 4 liter of methanol containing 20% water and eluted with water to harvest fractions (each 100 ml). Fractions Nos. 40–50 ntaining 20% water and eluted with water to amounting 1 liter in total were collected and combined. The combined fractions were concentrated in vacuo to 200 ml and lyophilized to result 4.3 g of pale yellowish hygroscopic powder, of which aqueous solution (concentrations — 10 mcg/ml) had a prophylactic value of 90%.

EXAMPLE 19

Powder (4.0 g) obtained according to Example 18 was dissolved in 5 ml of water and passed through a column packed with 500 g of gel-filtering agent, Sephadex G-15 having a height of 1.5 meter. The column was developed and eluted with water to harvest fractions (each 10 ml). Fractions Nos. 75–90 amounting 150 ml in total were collected and combined. The combined fractions were lyophilized to result 1.3 g of white powder, of which aqueous solution (concentration — 10 g mcg/ml) had a prophylactic value of 96% on tobacco mosaic virus and that containing 1 mcg/ml had a value of 91%.

EXAMPLE 20

A fermented broth obtained in a similar manner to that described in Example 2 was filtered to give 1,000 liter of filtrate. The filtrate was adsorbed onto 50 Kg of active carbon and was eluted by methanolic ammonia water. The eluate was concentrated in vacuo and methanol was added to precipitate 1 Kg of crude product.

The crude product was passed through an active alumina column (20 liters). The column was washed with 80% methanol and active substances were eluted with water. The active substances were concentrated in vacuo and treated with methanol to give 80 g of precipitate. An aqueous solution of said precipitate having a concentration of 1 mg/ml had a prophylactic value of 90%. The precipitate was further adsorbed onto silica-gel and was eluted by propanolic ammonia water. Since the eluate contained salt and was colored, it was treated with granular carbon for desalting and decoloring.

The eluate was concentrated and was treated with methanol to give 5 g of precipitate in the form of a white powder, which had prophylactic values of 92% at a concentration of 0.1 mg/ml and of 62% at a concentration of 0.01 mg/ml. The elemental analysis of the white powder obtained was as follows:

C: 38.88%   N: 4.89%
H: 7.28%    O: 48.95%

Reaction with halogen and sulfur was negative.

What is claimed is:

1. A process for producing a substance 84-B-3 capable of inhibiting plant disease virus, which comprises cultivating in a medium containing an assimilable carbon source and nitrogen source and inorganic substance a microorganism belonging to Streptomyces selected from the group consisting of *Streptromyces Rameus* (ATCC21273) and Streptomyces S.P. No. 290 (ATCC 21274) until a sufficient amount of the 84-B-3 is accumulated therein, and recovering the accumulated 84-B-3 therefrom.

2. The process of claim 1 wherein the cultivation is carried out at a pH of from 6 to 8 and at a temperature of from 22°C to 40°C.

3. A substance denoted 84-B-3 capable of inhibiting plant disease virus produced by the process of claim 1.

* * * * *